United States Patent
Sato et al.

(10) Patent No.: US 11,274,176 B2
(45) Date of Patent: Mar. 15, 2022

(54) COMPOSITE AND PRODUCTION METHOD THEREOF

(71) Applicants: NATIONAL INSTITUTE OF TECHNOLOGY, Tokyo (JP); NATIONAL UNIVERSITY CORPORATION YOKOHAMA NATIONAL UNIVERSITY, Yokohama (JP); KYOTO UNIVERSITY, Kyoto (JP); NISSHINBO HOLDINGS INC., Tokyo (JP)

(72) Inventors: Takaya Sato, Tsuruoka (JP); Hiroyuki Arafune, Tsuruoka (JP); Takashi Morinaga, Tsuruoka (JP); Saika Honma, Tsuruoka (JP); Toshio Kamijo, Tsuruoka (JP); Ken Nakano, Yokohama (JP); Yoshinobu Tsujii, Kyoto (JP)

(73) Assignees: NATIONAL INSTITUTE OF TECHNOLOGY, Tokyo (JP); NATIONAL UNIVERSITY CORPORATION YOKOHAMA NATIONAL UNIVERSITY, Yokohama (JP); KYOTO UNIVERSITY, Kyoto (JP); NISSHINBO HOLDINGS INC., Tokyo (JP)

( * ) Notice: Subject to any disclaimer, the term of this patent is extended or adjusted under 35 U.S.C. 154(b) by 395 days.

(21) Appl. No.: 16/490,844

(22) PCT Filed: Mar. 2, 2018

(86) PCT No.: PCT/JP2018/008126
§ 371 (c)(1),
(2) Date: Sep. 3, 2019

(87) PCT Pub. No.: WO2018/159836
PCT Pub. Date: Sep. 7, 2018

(65) Prior Publication Data
US 2020/0002455 A1   Jan. 2, 2020

(30) Foreign Application Priority Data
Mar. 3, 2017   (JP) .............................. JP2017-040646

(51) Int. Cl.
*C08F 291/06*   (2006.01)
*C08J 3/12*   (2006.01)
*C08L 33/10*   (2006.01)
*C08L 53/00*   (2006.01)

(52) U.S. Cl.
CPC .............. *C08F 291/06* (2013.01); *C08J 3/12* (2013.01); *C08L 33/10* (2013.01); *C08L 53/00* (2013.01)

(58) Field of Classification Search
CPC .......... C08F 291/06; C08J 3/12; C08L 33/10; C08L 53/00
USPC ......................................................... 524/460
See application file for complete search history.

(56) References Cited

U.S. PATENT DOCUMENTS

| | | | |
|---|---|---|---|
| 4,604,425 A | 8/1986 | Ohmura et al. | |
| 4,698,388 A | 10/1987 | Ohmura et al. | |
| 2004/0034124 A1 | 2/2004 | Court et al. | |
| 2010/0104832 A1* | 4/2010 | Messe ..................... | C08L 63/00 428/201 |
| 2010/0273958 A1* | 10/2010 | Schmidt ................ | C08F 220/14 525/92 H |
| 2014/0018504 A1* | 1/2014 | Fine ........................ | B29B 9/065 525/280 |
| 2014/0227447 A1 | 8/2014 | Hustad et al. | |
| 2015/0056158 A1 | 2/2015 | Gunatillake et al. | |
| 2016/0251508 A1 | 9/2016 | Hustad et al. | |

FOREIGN PATENT DOCUMENTS

| | | |
|---|---|---|
| EP | 1 555 294 A1 | 7/2005 |
| JP | S59-202261 A | 11/1984 |
| JP | 2003-535181 A | 11/2003 |
| JP | 2006-316169 A | 11/2006 |
| JP | 2010-520949 A | 6/2010 |
| JP | 2011-506679 A | 3/2011 |
| JP | 2012-056165 A | 3/2012 |
| JP | 2014-508845 A | 4/2014 |
| JP | 2014-152331 A | 8/2014 |
| JP | 2015-509129 A | 3/2015 |
| JP | 2016-160433 A | 9/2016 |
| WO | 2013/052105 A2 | 4/2013 |
| WO | 2015/163383 A1 | 10/2015 |

OTHER PUBLICATIONS

Jan. 12, 2021 Search Report issued in European Patent Application No. 18760910.2.
May 1, 2018 Search Report issued in International Patent Application No. PCT/JP2018/008126.

* cited by examiner

*Primary Examiner* — Kelechi C Egwim
(74) *Attorney, Agent, or Firm* — Oliff PLC

(57) ABSTRACT

A composite including a plurality of block copolymer chains dispersed in a base polymer, the block copolymer chains including a polymer block (A) and a polymer block (B) having lower affinity for the base polymer than that of the polymer block (A), wherein each of the block copolymer chains has the polymer block (A) at two or more locations of the block copolymer chain, and in at least some of the block copolymer chains, the polymer blocks (A) are at least partially located in the base polymer and the polymer blocks (B) are at least partially exposed from the base polymer.

11 Claims, 1 Drawing Sheet

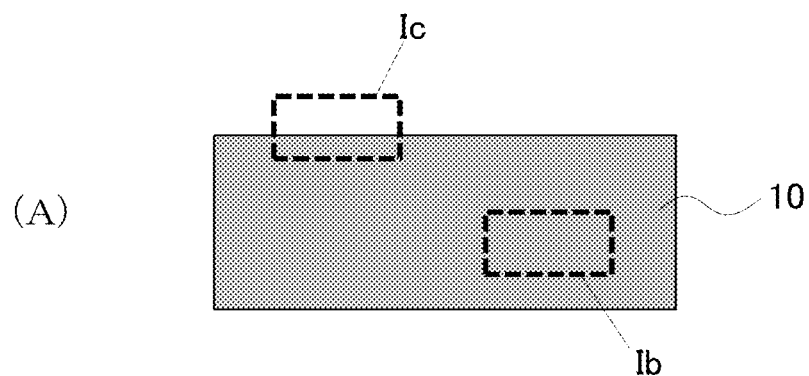
(A)
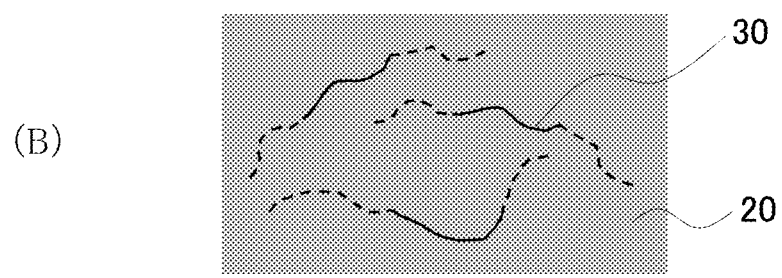
(B)
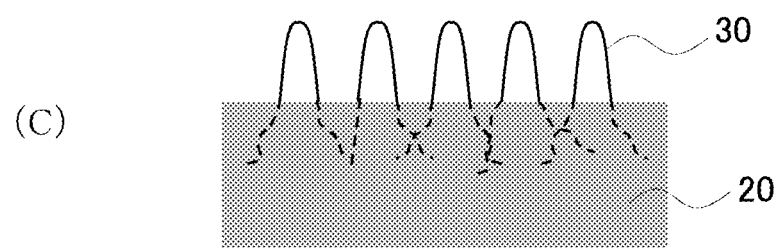
(C)

COMPOSITE AND PRODUCTION METHOD THEREOF

TECHNICAL FIELD

The present invention relates to a composite and a production method thereof.

BACKGROUND ART

It has been common knowledge that sliding surfaces having a polymer brush layer have a low friction coefficient. For example, Patent Document 1 discloses a sliding structure comprising a block having a polymer brush coating on a DLC-Si coating and a ring having a similar polymer brush coating.

In Patent Document 2, a detailed examination of a mechanism of sliding between polymer brush surfaces is performed using an atomic force microscope, and the technique disclosed therein enables micron-scale sliding between such brushes which an atomic force microscope can measure.

RELATED ART DOCUMENTS

Patent Document

Patent Document 1: JP-A 2012-56165
Patent Document 2: JP-A 2006-316169

SUMMARY OF THE INVENTION

Problems to be Solved by the Invention

On the other hand, in terms of stable, long-term use of materials having a sliding surface with such a polymer brush layer, excellent load bearing properties and durability have been required in addition to low friction sliding properties.

The purpose of the present invention is to provide a material having low friction sliding properties and having excellent load bearing properties and durability.

Means for Solving Problems

As a result of intensive studies to achieve the above object, the present inventors found that the object can be achieved by a composite wherein block copolymer chains are dispersed in a base polymer, the block copolymer chains comprise a polymer block (A) and a polymer block (B) having lower affinity for the base polymer than that of the polymer block (A), each of the block copolymer chains has the polymer block (A) at two or more locations, and in at least some of the block copolymer chains, the polymer blocks (A) are located in the base polymer and the polymer blocks (B) are exposed from the base polymer. This finding has led to the completion of the present invention.

Specifically, the present invention provides a composite comprising a plurality of block copolymer chains dispersed in a base polymer, the block copolymer chains comprising a polymer block (A) and a polymer block (B) having lower affinity for the base polymer than that of the polymer block (A), wherein each of the block copolymer chains has the polymer block (A) at two or more locations of the block copolymer chain, and in at least some of the block copolymer chains, the polymer blocks (A) are at least partially located in the base polymer and the polymer blocks (B) are at least partially exposed from the base polymer.

The present invention further provides a method for producing the composite, the method comprising the step of mixing the base polymer and the block copolymer chains, so that in at least some of the block copolymer chains, the polymer blocks (A) are located in the base polymer and the polymer blocks (B) are exposed from the base polymer. In this method, the mixing can be performed by any of the following methods: heating; mixing in a solvent; and mixing by dispersion.

The present invention also provides a method for producing the composite, the method comprising the steps of:

mixing the base polymer and the block copolymer chains under heat to prepare a molten mixture; and cooling the molten mixture to cause a phase separation, so that in at least some of the block copolymer chains, the polymer blocks (A) are located in the base polymer and the polymer blocks (B) are exposed from the base polymer.

Effects of Invention

The present invention can provide a composite having low friction sliding properties and having excellent load bearing properties and durability.

BRIEF DESCRIPTION OF DRAWINGS

FIG. 1 shows schematic views illustrating one example of the composite according to the present invention.

DESCRIPTION OF EMBODIMENTS

The composite according to the present invention comprises a plurality of block copolymer chains dispersed in a base polymer, the block copolymer chains comprising a polymer block (A) and a polymer block (B) having lower affinity for the base polymer than that of the polymer block (A).

Each of the block copolymer chains has the polymer block (A) at two or more locations of the block copolymer chain.

In at least some of the block copolymer chains, the polymer blocks (A) are at least partially located in the base polymer and the polymer blocks (B) are at least partially exposed from the base polymer.

The following description illustrates the structure of the composite according to the present invention based on a composite 10 shown in FIG. 1 as an example of the composite according to the present invention.

FIG. 1(A) is a schematic view illustrating one example of the composite according to the present invention, FIG. 1(B) is a detailed view of the structure of the portion Ib in FIG. 1(A), and FIG. 1(C) is a detailed view of the structure of the portion Ic in FIG. 1(A).

As shown in FIG. 1(B), the composite 10 according to one example of the present invention comprises a plurality of block copolymer chains 30 dispersed in a base polymer 20. The block copolymer chains 30 comprise a polymer block (A) and a polymer block (B) having lower affinity for the base polymer 20 than that of the polymer block (A). Each of the block copolymer chains 30 has the polymer block (A) at two or more locations of the block copolymer chain.

In FIG. 1(B), the polymer block (A) and the polymer block (B) which constitute the block copolymer chains 30 are represented by the dashed line and the solid line, respectively. Although in the example shown in FIG. 1(B), the block copolymer chains 30 are ABA-type block copolymer chains having a polymer block (A)/polymer block (B)/polymer block (A) structure, the block copolymer chains 30 are not limited to such a structure and may have any structure having the polymer block (A) at two or more locations. For example, the block copolymer chains 30 may be ABAB-type block copolymer chains having a polymer block (A)/polymer block (B)/polymer block (A)/polymer block (B) structure or ABABA-type block copolymer chains having a polymer block (A)/polymer block (B)/polymer block (A)/polymer block (B)/polymer block (A) structure.

As shown in FIG. 1(C), in some of the block copolymer chains 30 in the composite 10 according to one example of the present invention, the polymer blocks (A) are at least partially located in the base polymer 20 and the polymer blocks (B) are at least partially exposed from the base polymer 20. Accordingly, the composite 10 can have a structure in which a plurality of polymer chain loop structures of the block copolymer chains 30 is exposed from the surface of the composite 10.

In particular, the block copolymer chains 30 used in the composite 10 according to one example of the present invention have the polymer block (A)/polymer block (B)/polymer block (A) structure. The polymer block (A) has relatively high affinity for the base polymer 20 while the polymer block (B) has relatively low affinity for the base polymer 20. For this reason, the polymer block (B) is at least partially exposed from the base polymer 20 while the polymer blocks (A) on both sides of the polymer block (B) at least partially remain in the base polymer 20. As a result, such a loop structure of the polymer block (B) as shown in FIG. 1(C) can be formed. In this case, since each of the two polymer blocks (A) on both sides of the polymer block (B) at least partially remains in the base polymer 20, such a loop structure can be formed.

In the composite 10 according to one example of the present invention, because of such loop structures of the polymer blocks (B), the surface of the composite 10 can have low friction sliding properties. Additionally, when the composite is used as a sliding material, such loop structures result in excellent load bearing properties and durability. For example, if AB-type block copolymer chains having a polymer block (A)/polymer block (B) structure are used instead of the block copolymer chains 30, such loop structures are not formed, resulting in insufficient low friction sliding properties and poor load bearing properties and durability. In contrast, because the loop structures of the polymer blocks (B) can be formed, the composite 10 according to one example of the present invention can have low friction sliding properties and excellent load bearing properties and durability.

Additionally, in the composite 10 according to one example of the present invention, a plurality of block copolymer chains 30 not involved in the loop structures shown in FIG. 1(C) is dispersed in the polymer block 20 (for example, see FIG. 1(B)). For example, when some of the block copolymer chains 30 involved in the loop structures shown in FIG. 1(C) are damaged as a result of using the composite as a sliding material, among the block copolymer chains 30 dispersed in the base polymer 20, block copolymer chains 30 located in the vicinity of damaged sites turn into chains with the loop structure shown in FIG. 1(C) to repair the damage. Thus, the composite 10 has a self-repairing mechanism. It should be noted that the self-repairing action to repair damaged loop structures cannot be expected when the loop structures are formed on the surface of the base polymer 20 by contacting a plurality of block copolymer chains 30 with the surface of the base polymer 20, for example, instead of dispersing the block copolymer chains 30 in the base polymer 20.

The base polymer 20 is not particularly limited, and any of various resins and rubbers can be used without limitation. Examples of the resins include both thermosetting resins and thermoplastic resins. Examples of the thermosetting resins include epoxy resin, phenol resin, amino resin, unsaturated polyester resin, polyurethane resin, urea resin, melamine resin, thermosetting polyimide resin, diallyl phthalate resin, and the like.

Examples of the thermoplastic resins include polyolefin resins such as polyethylene, polypropylene, polystyrene, and polycycloolefin; vinyl resins such as polystyrene, acrylic resins, polyvinyl chloride resin, and polyvinyl alcohol; fluororesins such as polytetrafluoroethylene; polyester resins such as polyethylene terephthalate, polybutylene terephthalate, polytrimethylene terephthalate, and polyethylene naphthalate; silicone resins such as polydimethyl siloxane; and the like.

Examples of the rubbers include diene rubbers such as butadiene rubber, styrene butadiene rubber, chloroprene rubber, isoprene rubber, natural rubber, nitrile rubber, and butyl rubber; rubbers other than diene rubbers, such as ethylene propylene rubber, acrylic rubber, polyether rubber, polyurethane rubber, fluororubber, and silicone rubber; and the like.

Among these resins and rubbers, preferred are polystyrene, acrylic resins, silicone resins, and styrene butadiene rubber. Acrylic resins are preferred. Among acrylic resins, particularly preferred is polybutyl methacrylate.

In terms of further improved low friction sliding properties and further enhanced load bearing properties and durability, the base polymer 20 preferably has a glass transition temperature (Tg) lower than the temperature at which the composite 10 is used. Specifically, the base polymer 20 has a Tg of preferably 50° C. or lower, more preferably 20° C. or lower.

The block copolymer chains 30 are not particularly limited, and can be any block copolymer chain having the polymer block (A) and the polymer block (B) having lower affinity for the base polymer 20 than that of the polymer block (A) and having the polymer block (A) at two or more locations thereof. In order to successfully form the loop structures shown in FIG. 1(C), those in which the polymer block (B) is incompatible with the base polymer 20 are preferably used. In particular, those in which the polymer block (B) is incompatible with the base polymer 20 and the polymer block (A) is compatible with the base polymer 20 are particularly preferably used.

The expression "the polymer block (A) is compatible with the base polymer 20" means the following feature. Specifically, the polymer block (A) can be considered as compatible if the following condition is satisfied: A polymer consisting of only the polymer block (A) is mixed with the base polymer 20 by hot melt mixing, co-solution mixing, or the like, and the resulting mixture is then solidified by cooling, solvent removal by evaporation, or the like to prepare a sample. When the glass transition temperature (Tg) of the sample is measured, a Tg different from the Tg of the polymer consisting of only the polymer block (A) and from the Tg of the base polymer 20 is observed in the temperature range between these Tgs.

The expression "the polymer block (B) is incompatible with the base polymer 20" means the following feature. Specifically, the polymer block (B) can be considers as incompatible if the following condition is satisfied: A polymer consisting of only the polymer block (B) is mixed with the base polymer 20 by hot melt mixing, co-solution mixing, or the like, and the resulting mixture is solidified by cooling or solvent removal by evaporation, or the like to prepare a sample. When the glass transition temperature (Tg) of the sample is measured, a Tg different from the Tg of the polymer consisting of only the polymer block (B) and from the Tg of the base polymer 20 is not observed in the temperature range between these Tgs.

The polymer block (A) and the polymer block (B) may be any polymer blocks which satisfy the above-mentioned compatibility relations with the base polymer 20, respectively. In order to successfully form the loop structures shown in FIG. 1(C), SP values (solubility parameter) of these blocks preferably satisfy the following relation: The difference between the SP value of the polymer block (A) and the SP value of the polymer block (B) is 1.5 $(MPa)^{1/2}$ or more, more preferably 3 $(MPa)^{1/2}$ or more, further preferably 5 $(MPa)^{1/2}$ or more. Additionally, the SP value of the polymer block (A) preferably satisfies the following relation: The difference between the SP value of the polymer block (A) and the SP value of the base polymer is 0.5 $(MPa)^{1/2}$ or less, more preferably 0.3 $(MPa)^{1/2}$ or less, further preferably 0.2 $(MPa)^{1/2}$ or less. The SP value of the polymer block (B) preferably satisfies the following relationship: the difference between the SP value of the polymer block (B) and the SP value of the base polymer is 1.5 $(MPa)^{1/2}$ or more, more preferably 3 $(MPa)^{1/2}$ or more, further preferably 5 $(MPa)^{1/2}$ or more. As the SP values of the polymer block (A) and the polymer block (B), values disclosed in Polymer Handbook (4th edition, Wiley-Interscience) can be used, for example.

The polymer block (A) may be any polymer block which satisfies the above features, and is not particularly limited. The polymer block (A) can be selected according to the base polymer 20 to be used. Specific examples thereof include those comprising polymer segments of the resins and the rubbers listed above as the resins and the rubbers which can constitute the base polymer 20, and the like.

The molecular weight (weight average molecular weight (Mw)) of polymer block (A) units of the block copolymer chains 30 is not particularly limited. In order to ensure sufficient interaction with the base polymer 20 which provides more suitable support for the loop structures formed of the polymer block (B) and thereby further improves the durability, the molecular weight is preferably 1,000 to 100,000, more preferably 1,000 to 50,000, further preferably 1,000 to 20,000, still more preferably 2,000 to 20,000, particularly preferably 2,000 to 6,000.

The polymer block (B) may be any polymer block which satisfies the above features, and is not particularly limited. The polymer block (B) can be selected according to the base polymer 20 to be used. Specific examples thereof include polyethylene glycol blocks, ionic liquid polymer blocks, polyelectrolyte blocks, and the like. Among these, polyethylene glycol blocks and ionic liquid polymer blocks are more preferable in terms of further improved low friction sliding properties and further enhanced load bearing properties and durability.

The ionic liquid polymer blocks are not particularly limited and may be any polymer blocks formed by polymerization of monomers having a melting point of 50° C. or lower, preferably 25° C. or lower. Examples thereof include polymer blocks produced by polymerization of compounds represented by General Formula (1) below, and the like.

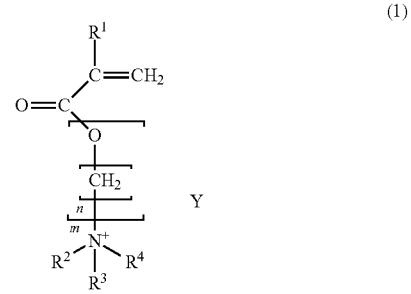

[In General Formula (1), m represents an integer of 1 to 10, n represents an integer of 1 to 5, $R^1$ represents a hydrogen atom or a $C_1$ to $C_3$ alkyl group, and $R^2$, $R^3$, and $R^4$ represent a $C_1$ to $C_5$ alkyl group. $R^2$, $R^3$, and $R^4$ may contain one or more hetero atoms selected from an oxygen atom, a sulfur atom, and a fluorine atom, and two or more of $R^2$, $R^3$, and $R^4$ may be linked to form a ring structure. Y represents a monovalent anion.]

The monovalent anion Y is not particularly limited, and any of the following anions can be used: $BF_4^-$, $PF_6^-$, $AsF_6^-$, $SbF_6^-$, $AlCl_4^-$, $NbF_6^-$, $HSO_4^-$, $ClO_4^-$, $CH_3SO_3^-$, $CF_3SO_3^-$, $CF_3CO_2^-$, $(CF_3SO_2)_2N^-$, $Cl^-$, $Br^-$, $I^-$, and the like. In terms of safety, $BF_4^-$, $PF_6^-$, $(CF_3SO_2)_2N^-$, $CF_3SO_3^-$, and $CF_3CO_2^-$ are particularly suitable.

Among the compounds represented by General Formula (1), compounds represented by General Formulae (2) to (9) are particularly suitably used.

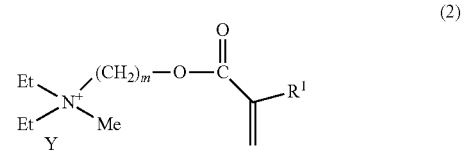

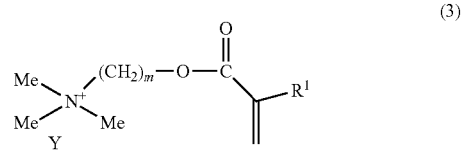

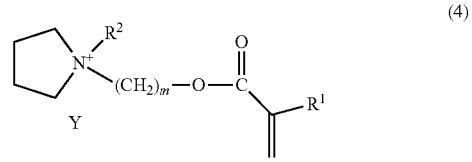

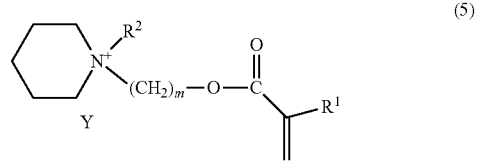

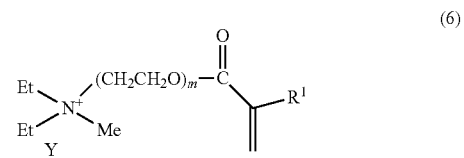

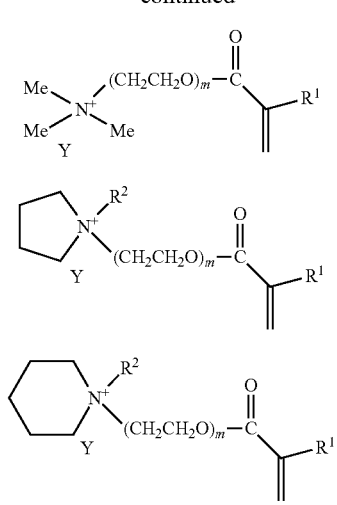

(7)

(8)

(9)

[In General Formulae (2) to (9), m, $R^1$, $R^2$, and Y are the same as those defined in General Formula (1). Me represents a methyl group and Et represents an ethyl group.]

The molecular weight (weight average molecular weight (Mw)) of polymer block (B) units of the block copolymer chains 30 is not particularly limited. The molecular weight of the polymer block (B) units strongly correlates with the length of loops to be formed (the length of loops constituting the loop structures). A higher molecular weight of the polymer block (B) units results in formation of longer loops on the surface of the composite 10 or, in other words, an increased thickness of the polymer loop layer (the layer configured from loop structures formed by the polymer block (B) unit), which contributes to low friction sliding properties. In contrast, a lower molecular weight of the polymer block (B) units results in a thin polymer loop layer. In view of damage to the loop brush caused by projections and recesses on a sliding surface facing the loop brush layer, the loop brush length is preferably long from the viewpoint of the durability of the sliding surface because friction caused by contact with the facing surface is reduced. However, when the polymer block (B) units have an excessively high molecular weight to increase the loop length, the entire block copolymer chains have a high molecular weight, suppressing dispersion of the molecules in the base polymer 20. As a result, the phase separation, which forms the loop structures, presumably takes a longer time. Accordingly, the molecular weight of the polymer block (B) units is preferably determined in consideration of the balance between the molecular weight of the entire block copolymer chains and the desired loop length. Specifically, the molecular weight (weight average molecular weight (Mw)) of the polymer block (B) units is preferably 1,000 to 200,000, more preferably 2,000 to 100,000, further preferably 3,000 to 50,000, still more preferably 3,000 to 20,000, particularly preferably 3,000 to 6,000.

Any method of synthesizing the block copolymer chains 30 can be used without limitation. When the block copolymer chains 30 are ABA-type block copolymer chains having a polymer block (A)/polymer block (B)/polymer block (A) structure, the block copolymer chains can be synthesized by the following methods. Specific examples thereof include: a method of polymerizing the monomer for forming the polymer block (A) in the presence of the polymer block (B) to form the polymer blocks (A) on both sides of the polymer block (B); a method of polymerizing the monomer for forming the polymer block (B) in the presence of the polymer block (A), and then further polymerizing the monomer for forming the polymer block (A); and the like. Living radical polymerization can be particularly suitably used because this method enables control of the molecular weight of each block and provides block copolymers having a narrow molecular weight distribution. In particular, atom transfer radical polymerization can be particularly suitably used.

The polymer block (A) and the polymer block (B) may be directly linked to each other or may be linked via a monomer other than the monomers for the polymer block (A) and the polymer block (B) or via an oligomer block of such a monomer. The polymer blocks (A) in the block copolymer chains 30 may be substantially identical polymer blocks (blocks consisting of substantially identical monomer units) or may be different from one another. When the block copolymer chains 30 include a plurality of polymer blocks (B), these block copolymers (B) may be substantially identical polymer blocks (blocks consisting of substantially identical monomer units) or may be different from one another.

From the viewpoint of further improved low friction sliding properties and further enhanced load bearing properties and durability, the polymer blocks (B) constituting the loop structures shown in FIG. 1(C) (the polymer blocks (B) exposed from the base polymer 20) are preferably swollen by a good solvent for the polymer block (B). The good solvent for the polymer block (B) may be any solvent having high compatibility with the polymer block (B) and is not particularly limited. For example, when the polymer block (B) is a polyethylene glycol block, glycerol, water, ethylene glycol, and the like can be used. When the polymer block (B) is an ionic liquid polymer block, an ionic liquid can be suitably used. In particular, when the polymer block (B) is a polymer of a compound represented by General Formula (1), a compound which is represented by General Formula (10) shown below and has a melting point of 50° C. or less, preferably 25° C. or less can be used. In particular, the use of such a good solvent can further stabilize the polymer blocks (B) constituting the loop structures shown in FIG. 1(C). Additionally, when some of the block copolymer chains 30 involved in the loop structures shown in FIG. 1(C) are damaged, the use of such a good solvent further accelerates the self-repairing action by the following mechanism: Among the block copolymer chains 30 dispersed in the base polymer 20, polymer blocks (B) constituting block copolymer chains 30 in the vicinity of the damaged sites form loop structures (i.e., self-repairing). In this process, the loop structures can be formed in a relatively short time due to the effect of the good solvent (in particular, as a result of penetration of part of the good solvent into the base polymer 20).

(10)

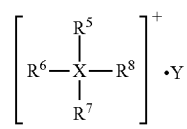

[In General Formula (10), $R^5$ to $R^8$, which may be the same or different, represent a $C_1$ to $C_5$ alkyl group or an alkoxyalkyl group represented by R'—O—$(CH_2)_p$— (wherein R' represents a methyl group or an ethyl group and p is an integer of 1 to 4), and any two of $R^5$, $R^6$, $R^7$, and $R^8$ may form a ring, provided that at least one of $R^5$ to $R^8$ is the alkoxyalkyl group. X is a nitrogen atom or a phosphorus atom and Y is a monovalent anion.]

Examples of the $C_1$ to $C_5$ alkyl group include a methyl group, an ethyl group, a propyl group, 2-propyl group, a butyl group, a pentyl group, and the like. Examples of the alkoxyalkyl group represented by $R'$—O—$(CH_2)_p$— include a methoxymethyl or ethoxymethyl group, a methoxyethyl or ethoxyethyl group, a methoxypropyl or ethoxypropyl group, a methoxybutyl or ethoxybutyl group, and the like.

Examples of compounds in which two of $R^5$, $R^6$, $R^7$, and $R^8$ form a ring include quaternary ammonium salts having an aziridine ring, an azetidine ring, a pyrrolidine ring, a piperidine ring, or the like (where X is a nitrogen atom); and quaternary phosphonium salts having a pentamethylenephosphine (phosphorinane) or the like (where X is a phosphorus atom).

Particularly suited are quaternary ammonium salts having, as at least one substituent, a methoxyethyl group where R' is a methyl group and p is 2.

Quaternary ammonium salts which are represented by General Formula (11) and have a methyl group, two ethyl groups, and an alkoxyethyl group as substituents are also suitably used.

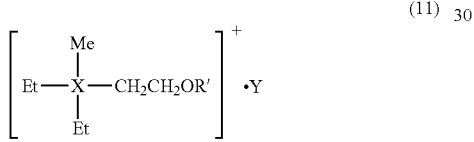

(11)

[In General Formula (11), R' represents a methyl group or an ethyl group, X is a nitrogen atom or a phosphorus atom, and Y represents a monovalent anion. Me represents a methyl group and Et represents an ethyl group.]

Examples of the monovalent anion Y in General Formulae (10) and (11) are the same anions listed for General Formula (1).

From the viewpoint of further improved low friction sliding properties and further enhanced load bearing properties and durability, examples of the quaternary salts represented by General Formulae (10) and (11) include compounds represented by Formulae (12) to (20) (wherein Me represents a methyl group and Et represents an ethyl group) shown below. In particular, compounds represented by Formula (12) and Formula (17) are more preferable.

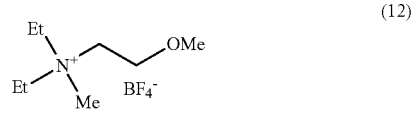

(12)

(13)

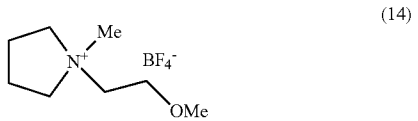

(14)

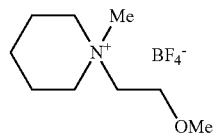

(15)

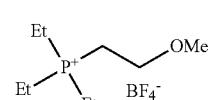

(16)

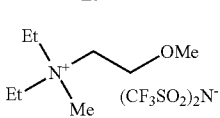

(17)

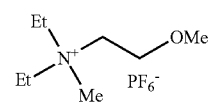

(18)

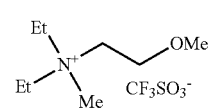

(19)

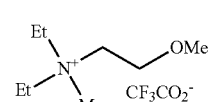

(20)

The composite 10 according to one example of the present invention can be produced, for example, by the following production method.

Specifically, the composite 10 according to one example of the present invention can be produced by a production method comprising the steps of:

mixing the base polymer 20 and the block copolymer chains 30 in a solvent to prepare a liquid mixture; and removing the solvent from the mixture to cause a phase separation, so that in at least some of the block copolymer chains 30, the polymer blocks (A) are located in the base polymer 20 and the polymer blocks (B) are exposed from the base polymer.

In the step of mixing the base polymer 20 and the block copolymer chains 30 in the solvent, any solvent which can dissolve or disperse the base polymer 20 and the block copolymer chains 30 can be used without limitation. Examples thereof include aliphatic hydrocarbons such as n-pentane, n-hexane, and n-heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons such as benzene, toluene, xylene, and mesitylene; nitrogen-containing hydrocarbons such as nitromethane, nitrobenzene, acetonitrile, propionitrile, and benzonitrile; ethers such as diethyl ether, tetrahydrofuran, and dioxane; ketones such as acetone, ethyl methyl ketone, methyl isobutyl ketone, cyclopentane, and cyclohexanone; esters such as methyl acetate, ethyl acetate, ethyl propionate, and methyl benzoate; halogenated hydrocarbons such as chloroform, dichloromethane, 1,2-dichloroethane, chlorobenzene, dichlorobenzene, and trichlorobenzene; and the like.

By mixing and dissolving or dispersing the base polymer 20 and the block copolymer chains 30 in such a solvent, a liquid mixture can be prepared. Subsequently, the prepared liquid mixture is used to form a coating by casting or spin coating, and then the solvent is removed from the coating of the liquid mixture to cause a phase separation. Thus, the composite 10 can be produced. Specifically, the solvent is removed, so that in some of the block copolymer chains 30 dispersed via the solvent in the base polymer 20, the polymer blocks (B) constituting the block copolymer chains 30 form a phase separate from the base polymer 20 while the polymer blocks (A) remain compatible with the base polymer 20. As a result, in the changed structure, the polymer blocks (A) are located in the base polymer 20 and the polymer blocks (B) are exposed from the base polymer. Thus, the loop structures shown in FIG. 1(C) can be formed.

Any method of removing the solvent can be used without limitation and can be selected according to the type of the solvent to be used. A preferred method is to heat at 50° C. to 100° C., and a more preferred method is to heat at 70° C. to 80° C.

When the resin or the rubber constituting the base polymer 20 is cross-likable, the base polymer 20 may be cross-linked before or during the phase separation. Any cross-linking method can be used without limitation. Examples thereof include heating, electron-beam or ultraviolet irradiation, and the like. Alternatively, the cross-linking and the phase separation may be performed at the same time by utilizing the heat applied to remove the solvent and thereby cause the phase separation.

Alternatively, the composite 10 according to one example of the present invention can also be produced by a production method comprising the steps of:

mixing the base polymer 20 and the block copolymer chains 30 under heat to prepare a molten mixture; and cooling the molten mixture to cause a phase separation, so that in at least some of the block copolymer chains 30, the polymer blocks (A) are located in the base polymer 20 and the polymer blocks (B) are exposed from the base polymer.

In the step of mixing the base polymer 20 and the block copolymer chains 30 under heat to prepare a molten mixture, the heating temperature is not particularly limited and may be any temperature at which the base polymer 20 or the block copolymer chains 30 melts, preferably a temperature at which both the base polymer 20 and the block copolymer chains melt. The heating temperature is preferably 40° C. to 300° C., more preferably 80° C. to 200° C.

The prepared molten mixture is used to form a coating by casting or spin coating, and then the coating is cooled. In the step of cooling to cause solidification, the phase separation is caused to form the composite 10. Specifically, in some of the block copolymer chains 30 dispersed in the base polymer 20 by melt mixing, the polymer blocks (B) constituting the block copolymer chains 30 form a phase separate from the base polymer 20 during the transition from the molten state to the solid state while the polymer blocks (A) remain compatible with the base polymer 20. As a result, in the changed structure, the polymer blocks (A) are located in the base polymer 20 and the polymer blocks (B) are exposed from the base polymer. Thus, the loop structures shown in FIG. 1(C) can be formed.

Any method of cooling the molten mixture can be used without limitation. Examples thereof include a method of leaving the formed coating of the molten mixture at rest at room temperature; a method of leaving the coating at rest while warming the coating at a temperature lower than the melting points of the components of the molten mixture; and the like.

Also in this case, when the resin or the rubber constituting the base polymer 20 is cross-likable, the base polymer 20 may be cross-linked before or during the phase separation. Any cross-linking method can be used without limitation. Examples thereof include heating, electron-beam or ultraviolet irradiation, and the like. Alternatively, in the step of cooling the molten mixture, the cross-linking and the phase separation may be performed at the same time.

In both methods, as a result of the phase separation from the base polymer 20 of the block copolymer chains mixed in the base polymer 20, the incompatible polymer blocks (B) form at least partially exposed loops on the surface of the base polymer 20. On the other hand, the rate of formation of loop-shaped polymer brush chains depends on the rate of phase separation. One method that may be used to accelerate the formation of loop-shaped polymer brush chains is to contact a good solvent for the polymer block (B) with the surface of the base polymer 20. As the good solvent in contact with the surface of the base polymer 20 penetrates into the base polymer 20, the phase separation of the polymer block (B) in the base polymer 20 may be accelerated. The good solvent for the polymer block (B) may be any solvent having high compatibility with the polymer block (B). For example, when the polymer block (B) is a polyethylene glycol block, glycerol, water, ethylene glycol, and the like can be used. When the polymer block (B) is an ionic liquid polymer block, an ionic liquid can be suitably used. In this case, such a good solvent can be used at it is to swell the polymer blocks (B) constituting the loop structures shown in FIG. 1(C). As a result, the composite 10 having further improved low friction sliding properties and further enhanced load bearing properties and durability can be more suitably produced with high productivity.

For example, in the method involving causing the phase separation by removing the solvent, the good solvent for the polymer block (B) may be contacted with the surface of the base polymer 20 after the solvent is removed. In the method involving causing the phase separation during solidification by cooling the molten mixture, the good solvent for the polymer block (B) may be contacted with the surface of the base polymer 20 after cooling to a predetermined temperature.

Instead of the method involving causing the phase separation by removing the solvent and the method involving causing the phase separation during solidification by cooling the molten mixture, a method may be used which comprises preparing a formed body containing the base polymer 20 and the block copolymer chains 30, and contacting the good solvent for the polymer block (B) with the surface of the formed body to cause a phase separation. Also in this case, when the resin or the rubber constituting the base polymer 20 is cross-likable, the base polymer 20 may be cross-linked before or during the phase separation. Any cross-linking method can be used without limitation. Examples thereof include heating, electron-beam or ultraviolet irradiation, and the like.

According to the present invention, in at least some of the block copolymer chains 30, the polymer blocks (A) are at least partially located in the base polymer 20 and the polymer blocks (B) are at least partially exposed from the base polymer 20, thereby forming a structure in which a plurality of polymer chain loop structures of the block copolymer chains 30 is exposed from the surface of the composite 10. According to the present invention, such a structure results in a composite 10 having low friction sliding properties and excellent load bearing properties and durability.

Although the composite 10 shown in FIG. 1 is illustrated in the above description as an example of the composite according to the present invention, the composite 10 is only an example for easy understanding of the present invention, and should not be construed as limiting the present invention. The present invention includes all modifications of the design and equivalents which fall within the technical scope of the present invention.

EXAMPLES

The following description illustrates the present invention more specifically by way of Examples. These examples should not be construed as limiting the present invention.

Example 1

Synthesis of Polymethyl Methacrylate-Polyethylene Glycol-Polymethyl Methacrylate (PMMA-PEG-PMMA) Triblock Copolymer An amount of 4.00 g of bi-terminally activated polyethylene glycol (PEG4000, weight average molecular weight (Mw, measured by GPC): 5600) and 21.5 g of triethylamine were mixed in a stirring vessel. The resulting liquid mixture was bubbled with argon gas for 15 minutes, and was dissolved in dehydrated tetrahydrofuran (THF). The solution was bubbled with argon gas for another 10 minutes. Subsequently, 44.5 g of 2-bromoisobutyryl bromide was slowly added dropwise in an argon atmosphere while the solution was ice-cooled, and the mixture was stirred at room temperature for 3 hours. After the 3-hour stirring, the resulting mixture was cooled and stored in a refrigerator at 5° C. overnight, and was then purified. Thus, bi-terminally brominated polyethylene glycol (Br-PEG-Br) was prepared.

Next, 2.80 g of the bi-terminally brominated polyethylene glycol prepared above, 8.00 g of methyl methacrylate, 0.613 g of tetramethylenediamine, and 0.535 g of copper bromide (CuBr$_2$) were mixed and stirred at 80° C. for 35 minutes, and the mixture was then purified. Thus, a polymethyl methacrylate-polyethylene glycol-polymethyl methacrylate (PMMA-PEG-PMMA) triblock copolymer was prepared. The prepared polymethyl methacrylate-polyethylene glycol-polymethyl methacrylate triblock copolymer had a weight average molecular weight (Mw) of 13200, which indicates that the weight average molecular weight (Mw, measured by GPC) of the polymethyl methacrylate blocks of the prepared polymethyl methacrylate-polyethylene glycol-polymethyl methacrylate triblock copolymer was 3800 and the weight average molecular weight (Mw, measured by GPC) of the polyethylene glycol block was 5600.

Synthesis of Polybutyl Methacrylate (PBMA)

In a stirring container, 1.0 g of butyl methacrylate and 0.005 g of azoisobutyronitrile were dissolved in 0.1 g of tetrahydrofuran. The resulting solution was bubbled with argon gas for 10 minutes, and was then heated at 65° C. for 2 hours to polymerize butyl methacrylate. Thus, polybutyl methacrylate (PBMA) was prepared.

Formation of Composite on Glass Plate Surface Using Polybutyl Methacrylate (PBMA) and Polymethyl Methacrylate-Polyethylene Glycol-Polymethyl Methacrylate (PMMA-PEG-PMMA) Triblock Copolymer In a stirring container, 0.04 g of the polybutyl methacrylate (PBMA) prepared above, 0.01 g of the polymethyl methacrylate-polyethylene glycol-polymethyl methacrylate (PMMA-PEG-PMMA) triblock copolymer prepared above, and 0.004 g of triethylene glycol dimethacrylate were dissolved in 0.4 g of tetrahydrofuran. Subsequently, 200 µL of the resulting mixture solution was dropped on the surface of a glass substrate mounted on a spin coater, and the glass substrate was rotated at 2000 rpm for 30 seconds to form a coating on the glass substrate. The glass substrate was then heated at 70° C. for 12 hours to remove the solvent. Thus, the glass substrate having a composite containing polybutyl methacrylate (PBMA) and the polymethyl methacrylate-polyethylene glycol-polymethyl methacrylate (PMMA-PEG-PMMA) on the surface was prepared. According to Polymer Handbook (4th edition, Wiley Interscience), the SP value of polybutyl methacrylate (PBMA) is 18.41 (MPa)$^{1/2}$, the SP value of the polymethyl methacrylate (PMMA) is 18.27 (MPa)$^{1/2}$, and the SP value of the polyethylene glycol (PEG) is 20.2 (MPa)$^{1/2}$.

Evaluation of Structure

A 90 wt % aqueous solution of glycerol as a lubricant was dropped on the surface of the composite formed on the surface of the glass substrate prepared above. Although the contact angle determined immediately after the dropping was 70°, the contact angle decreased to 32° after 10 minutes from the dropping. Observation of an infrared absorption spectrum obtained by attenuated total reflection infrared spectroscopy after dropping water revealed an increase in peak intensity derived from the ether bond over time. In contrast, such a change was not observed for a polybutyl methacrylate (PBMA) coating formed on a glass substrate using only polybutyl methacrylate (PBMA). These results indicate that the composite obtained in Example 1 had a structure in which the polyethylene glycol unit of the triblock copolymer was exposed from the surface of the composite. In particular, a comparison of the results of a friction test between Example 1 and Comparative Example 2 (described later) revealed a lower friction coefficient of the composite of Example 1. Based on this fact, the composite obtained in Example 1 was presumed to have a structure in which the polyethylene glycol unit of the triblock copolymer was exposed in a loop shape from the surface of the composite.

Friction Test

A smooth glass sheet was prepared by glassblowing and was bonded to a cylindrical glass disc (R=20 mm). Thus, a smooth glass disc was prepared. An amount of 30 mL of a 90 wt % aqueous solution of glycerol as a lubricant was dropped on the surface of the composite formed on the surface of the glass substrate prepared above. The smooth glass disc prepared above was placed facing the surface on which glycerol was dropped. These were set on a friction tester (product name: Tribogear Type-38, available from Shinto Scientific Co., Ltd.), and were subjected to a friction test under the conditions: load: 0.98 N, sliding speed: 5.0 mm/s, and sliding distance: 10 mm. The friction coefficient was found to be as low as 0.006.

Comparative Example 1

A polybutyl methacrylate (PBMA) coating was formed on a glass substrate using only polybutyl methacrylate without using the polymethyl methacrylate-polyethylene glycol-polymethyl methacrylate (PMMA-PEG-PMMA) triblock copolymer. The obtained polybutyl methacrylate (PBMA)

coating was evaluated in the same manner as in Example 1. The friction coefficient was found to be as high as 0.11.

Comparative Example 2

Synthesis and Evaluation of Polymethyl Methacrylate-Polyethylene Glycol (PMMA-PEG) Diblock Polymer In a stirring container, 20.00 g of mono-terminally activated polyethylene glycol (PEG2000, weight average molecular weight (Mw, measured by GPC: 3680)) and 6.6785 g of triethylamine were mixed, and the resulting liquid mixture was bubbled with argon gas for 15 minutes, and was dissolved in dehydrated tetrahydrofuran (THF). The solution was bubbled with argon gas for another 10 minutes. Subsequently, 13.79 g of 2-bromoisobutyryl bromide was slowly added dropwise in an argon atmosphere while the solution was ice-cooled, and the mixture was stirred at room temperature for 3 hours. After the 3-hour stirring, the resulting mixture was purified. Thus, mono-terminally brominated polyethylene glycol (Br-PEG) was prepared.

Next, 2.66 g of the mono-terminally brominated polyethylene glycol prepared above, 4.00 g of methyl methacrylate, 1.09 g of 4,4-dinonyl-2,2-bipyridine, and 0.535 g of copper chloride ($CuBr_2$) were mixed and stirred at 60° C. for 3 hours, and the mixture was then purified. Thus, a polymethyl methacrylate-polyethylene glycol (PMMA-PEG) diblock copolymer was prepared. The prepared polymethyl methacrylate-polyethylene glycol (PMMA-PEG) diblock copolymer had a weight average molecular weight (Mw) of 6260, which indicates that the weight average molecular weight (Mw, measured by GPC) of the polymethyl methacrylate block of the polymethyl methacrylate-polyethylene glycol diblock copolymer was 2580 and the weight average molecular weight (Mw, measured by GPC) of the polyethylene glycol block was 3680.

A glass substrate having a composite containing polybutyl methacrylate (PBMA) and the polymethyl methacrylate-polyethylene glycol (PMMA-PEG) diblock copolymer on the surface was prepared in the same manner as in Example 1 except that the polymethyl methacrylate-polyethylene glycol (PMMA-PEG) diblock copolymer prepared above was used.

Friction Test

The friction test was performed on the above-prepared glass substrate having the composite on the surface in the same manner as in Example 1 except that the load was 0.2 N. The friction coefficient was 0.008, which was relatively low but higher than that of Example 1 in which the triblock copolymer was used. An increase in load to 0.98 N resulted in a high coefficient of about 0.9 to 0.13. This change indicates inferior load bearing properties to those obtained with the triblock copolymer.

Example 2

Synthesis of Polybutyl Methacrylate-Polyethylene Glycol-Polybutyl Methacrylate (PBMA-PEG-PBMA) Triblock Copolymer An amount of 2.25 g of bi-terminally brominated polyethylene glycol prepared in the same manner as in Example 1, 5.00 g of butyl methacrylate, 0.58 g of 4,4-dinonyl-2,2-bipyridine, and 0.070 g of copper chloride ($CuBr_2$) were mixed and stirred at 60° C. for 3 hours, and the mixture was then purified. Thus, a polybutyl methacrylate-polyethylene glycol-polybutyl methacrylate (PBMA-PEG-PBMA) triblock copolymer was prepared. The prepared polybutyl methacrylate-polyethylene glycol-polybutyl methacrylate (PBMA-PEG-PBMA) triblock copolymer had a weight average molecular weight (Mw) of 9700, which indicates that the weight average molecular weight (Mw, measured by GPC) of the polybutyl methacrylate blocks of the obtained polybutyl methacrylate-polyethylene glycol-polybutyl methacrylate (PBMA-PEG-PBMA) triblock copolymer was 2050 and the weight average molecular weight (Mw, measured by GPC) of the polyethylene glycol block was 5600.

Formation of Composite, Friction Test

A glass substrate having a composite containing polybutyl methacrylate (PBMA) and the polybutyl methacrylate-polyethylene glycol-polybutyl methacrylate (PBMA-PEG-PBMA) triblock copolymer on the surface was prepared in the same manner as in Example 1. The friction test was performed on the prepared glass substrate having the composite on the surface at a load of 0.98 N in the same manner as in Example 1. The friction coefficient was found to be as low as 0.006.

Example 3

Synthesis of Polymethyl Methacrylate-Polyethylene Glycol-Polymethyl Methacrylate (PMMA-PEG-PMMA) Triblock Copolymer In a stirring container, 20.00 g of bi-terminally activated polyethylene glycol (PEG20000, weight average molecular weight (Mw, measured by GPC): 25700) and 0.61 g of triethylamine were mixed, and the resulting liquid mixture was bubbled with argon gas for 15 minutes, and was dissolved in dehydrated tetrahydrofuran (THF). The solution was bubbled with argon gas for another 10 minutes. Subsequently, 1.38 g of 2-bromoisobutyryl bromide was slowly added dropwise in an argon atmosphere while the solution was ice-cooled, and the mixture was stirred at room temperature for 3 hours. After the 3-hour stirring, the resulting mixture was cooled and stored in a refrigerator at 5° C. overnight, and was then purified. Thus, bi-terminally brominated polyethylene glycol (Br-PEG-Br) was prepared.

Next, 4.22 g of the bi-terminally brominated polyethylene glycol prepared above, 9.00 g of butyl methacrylate, 1.04 g of 4,4-dinonyl-2,2-bipyridine, and 0.125 g of copper chloride (CuCl) were mixed and stirred at 60° C. for 3 hours, and the mixture was then purified. Thus, a polybutyl methacrylate-polyethylene glycol-polybutyl methacrylate (PBMA-PEG-PBMA) triblock copolymer was prepared.

The prepared polybutyl methacrylate-polyethylene glycol (PBMA-PEG-PBMA) triblock copolymer had a weight average molecular weight (Mw) of 59300, which indicates that the weight average molecular weight (Mw measured by GPC) of the polybutyl methacrylate blocks of the prepared polybutyl methacrylate-polyethylene glycol-polybutyl methacrylate (PBMA-PEG-PBMA) triblock copolymer was 16800 and the weight average molecular weight (Mw measured by GPC) of the polyethylene glycol block was 25700.

Formation of Composite, Friction Test

A glass substrate having a composite containing polybutyl methacrylate (PBMA) and the polybutyl methacrylate-polyethylene glycol-polybutyl methacrylate (PBMA-PEG-PBMA) triblock copolymer on the surface was prepared in the same manner as in Example 1. The friction test was performed on the prepared glass substrate having the composite formed on the surface in the same manner as in Example 1 under the conditions: load: 0.98 N, sliding speed:

5.0 mm/s, and sliding distance: 10 mm. The friction coefficient was found to be as low as 0.019.

REFERENCE SIGNS LIST

10 Composite
20 Base polymer
30 Block copolymer chain

The invention claimed is:

1. A composite comprising a plurality of block copolymer chains dispersed in a base polymer, the block copolymer chains comprising a polymer block (A) and a polymer block (B) having lower affinity for the base polymer than that of the polymer block (A),
wherein each of the block copolymer chains has the polymer block (A) at two or more locations of the block copolymer chain, and
in at least some of the block copolymer chains, the polymer blocks (A) are at least partially located in the base polymer and the polymer blocks (B) are at least partially exposed from the base polymer.

2. The composite according to claim 1,
wherein the polymer block (B) constituting the block copolymer chains is incompatible with the base polymer.

3. The composite according to claim 1,
wherein the difference in SP value between the polymer block (A) and the polymer block (B) constituting the block copolymer chains is 1.5 $(MPa)^{1/2}$ or more.

4. The composite according to claim 3,
wherein the difference in SP value between the polymer block (A) constituting the block copolymer chains and the base polymer is 0.5 $(MPa)^{1/2}$ or less.

5. The composite according to claim 1,
wherein any glass transition temperature other than the glass transition temperature of the polymer block (A) itself and the glass transition temperature of the polymer block (B) itself is not observed for the block copolymer chains.

6. The composite according to claim 1,
wherein the polymer block (B) exposed from the base polymer is swollen by a good solvent for the polymer block (B).

7. A method for producing the composite according to claim 1, comprising:
mixing the base polymer and the block copolymer chains, so that in at least some of the block copolymer chains, the polymer blocks (A) are located in the base polymer and the polymer blocks (B) are exposed from the base polymer.

8. A method for producing the composite according to claim 1 comprising:
mixing the base polymer and the block copolymer chains under heat to prepare a molten mixture; and
cooling the molten mixture to cause a phase separation, so that in at least some of the block copolymer chains, the polymer blocks (A) are located in the base polymer and the polymer blocks (B) are exposed from the base polymer.

9. A method for producing the composite according to claim 1, comprising:
preparing a formed body comprising the block copolymer chains dispersed in the base polymer; and
contacting a good solvent for the polymer block (B) with the surface of the formed body to cause a phase separation, so that in at least some of the block copolymer chains, the polymer blocks (A) are located in the base polymer and the polymer blocks (B) are exposed from the base polymer.

10. The method for producing the composite according to claim 7, further comprising cross-linking the base polymer.

11. The method for producing the composite according to claim 10, wherein the cross-linking of the base polymer is performed before, simultaneously with, or after the phase separation.

* * * * *